//UNITED STATES PATENT OFFICE.

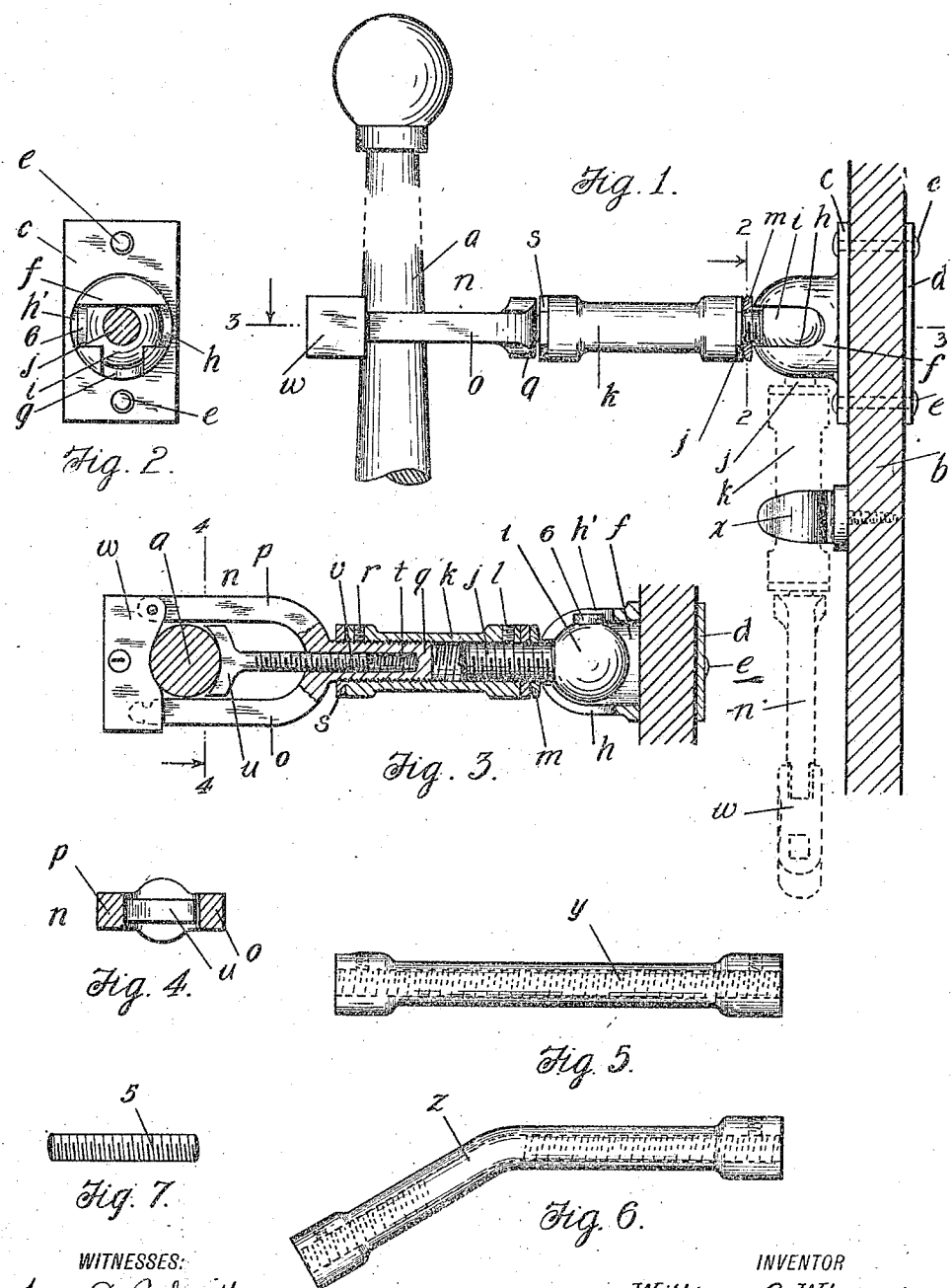

WILLIAM G. WHITESIDE, OF PORTLAND, OREGON.

LEVER-LOCKING MEANS.

1,165,352. Specification of Letters Patent. Patented Dec. 21, 1915.

Application filed March 23, 1915. Serial No. 16,512.

*To all whom it may concern:*

Be it known that I, WILLIAM G. WHITESIDE, a citizen of the United States, and a resident of Portland, county of Multnomah, and State of Oregon, have invented a new and useful Improvement in Lever-Locking Means, of which the following is a specification.

This invention relates to locking devices, serviceable for holding the control lever of an automobile in its neutral position.

My invention may be used in connection with any type of control lever, but is particularly adapted to be used in connection with the gear-shifting lever of an automobile.

The object of my invention is to provide simple lever locking means which may be adjusted to any type of lever, and when adjusted, will hold the lever against any movement sufficient for operating the mechanism controlled by such lever. This object I attain in the device hereinafter fully described, and the particular features of my invention are all fully illustrated in the accompanying drawings.

In such drawings, Figure 1 is a side elevation of my device, showing it in actual use as applied to the gear-shift lever of an automobile. The broken lines of this figure show the device in its inactive position; Fig. 2 is a vertical section taken on the line 2—2 of Fig. 1; Fig. 3 is a horizontal section taken on the line 3—3 of Fig. 1; Fig. 4 is a vertical section taken on the line 4—4 of Fig. 3; and Figs. 5, 6 and 7 show auxiliary extension units that may be used in connection with my lever locking means, for adapting them to be used under varying conditions.

*a* represents a well-known type of gear-shift lever, and *b* represents a part of the automobile body adjacent such lever. A bracket *c*, made with a ball-joint socket is riveted to the automobile body *b*, by means of the rivets *d*, and a companion plate *e*. The housing *f* of the bracket *c* is provided with a three-way slot, as indicated at *g, h* and *h'*. The ball *i* contained in the housing *f* of the bracket *c* has integrally formed thereon a threaded shank *j*, and the slots *g, h,* and *h'* are adapted to permit the shank *j* free movement. A stud 6 in the ball *i*, may be provided for limiting the movement of the shank *j*, in the housing *f* of the bracket. A tubular arm *k*, is threaded internally at both ends, and the shank *j* is threaded into one end of the former. When the members *j, k,* are adjusted relatively as to length, they are rigidly so fixed by a setscrew *l*, and lock-nuts *m*. The parts *j, k,* and *q*, are to be considered as parts of a longitudinally variable arm.

The outer end of my device by which the lever *a* is engaged is provided with a bifurcate shackle *n*, consisting of members *o* and *p*. The shackle *n* is made with a shank *q*, which is threaded into the free end of the tubular arm *k*, being also held rigidly in place, after having been longitudinally adjusted, by the set-screw *r*, and lock-nut *s*. The shank *q* of the shackle *n*, is furthermore provided with a longitudinally threaded bore *t*, and clamp head *u* is provided with a threaded shank *r*, which is threaded in said bore *t*. The clamp-head *u* has a width slightly smaller than the inside distance between the members *o* and *p*, of the shackle *n*, so that it may be rotated within the latter.

As apparent, the function of the longitudinally adjustable clamp-head *u*, of the bifurcate shackle *n*, is to increase or diminish the space within the members of the shackle, so that when the lever *a* is locked by my device, it will be held against any movement. This feature is particularly important, because of the fact that in certain gear-shift levers a very slight movement is sufficient to throw the speed changing mechanism into operative state. The same construction is also necessary in order to adapt my device to be used with all types of levers, for, otherwise, my device would have to be made in a variety of sizes, while as constructed by me it may be adjusted to any type of lever.

To the end of the member *p*, of the shackle is pivoted a latch-element *w*, which includes a lock of any standard type. Said latch-element is adapted to encircle the lever *a*, and it locks with the member *o*, of the shackle.

Below the bracket *c* is a spring clip *x*, screwed to the body *b*, and when the locking device is not in use, it is swung down to its position shown by broken lines in Fig. 1, and it is snapped into said spring clip *x*.

It is to be noted that as my device is shown in Fig. 1, the movement of my device is limited to 90° in either a horizontal plane or a vertical plane.

In Figs. 5 and 6 I have shown extension shank members which may be substituted for the tubular arm $k$, shown in Figs. 1 and 2, or used in connection therewith. The tubular arm $y$ is similar to $k$, except that it is of greater length; and in Fig. 6 the tubular arm $z$ is made with a bend so as to accommodate my device to the location of the lever $a$, or the necessary location of the bracket $c$. The threaded shank-member 5 shown in Fig. 7 forms a means for connecting the members $k$, $y$ and $z$ of the arm in any required combination.

The function of the stud 6 is to prevent the rotation of the ball $i$, in the socket $h$ of the bracket $c$, and thereby disconnecting the arm from the bracket.

I claim:

1. In combination with a fixed support, a longitudinally variable arm hinged to such support, a bifurcate shackle provided at the free end of the arm; means for increasing and diminishing the longitudinal space within the bifurcate members of the shackle, and a latch element secured to the outer ends of the members of the bifurcate shackle.

2. In combination with a fixed support, a longitudinally variable arm hinged to such support, a bifurcate shackle provided at the free end of the arm; a clamp head located between the members of the bifurcate shackle, and longitudinally adjustable thereof; a latch element secured to the outer ends of the members of the bifurcate shackle.

3. In combination with a fixed support, an arm hinged to such support, a bifurcate shackle provided at the free end of the arm; means for increasing and diminishing the longitudinal space within the bifurcate members of the shackle, and a latch element secured to the outer ends of the members of the bifurcate shackle.

4. A device of the character described comprising an arm adapted for being hinged to a fixed support, a bifurcate shackle provided at the free end of the arm; means for increasing and diminishing the longitudinal space within the bifurcate members of the shackle; and a latch element secured to the outer ends of the members of the bifurcate shackle.

5. In combination with a fixed support and a lever movable relative thereto, a longitudinally variable arm hinged to such support, a bifurcate shackle provided at the free end of the arm; and means for locking said lever in the shackle, and adapted to hold the lever against longitudinal movement in the shackle.

6. In a device of the character described, the combination of a bracket including a slotted spherical socket, a ball rotatable in such socket, and provided with a stud bearing in the slot of said socket, a longitudinally extensible arm fastened at one end to the ball, a bifurcate shackle at the free end of said arm, a clamp-head longitudinally adjustable between the members of the bifurcate shackle, and a latch element hinged at one side to one member of the bifurcate shackle, and key-controlled means for locking the other side of said latch element to the other member of said bifurcate shackle.

WILLIAM G. WHITESIDE.

Witnesses:
 WM. C. SCHMITT,
 D. E. CRABB.